Feb. 4, 1941.  C. A. CAMPBELL  2,230,524
AIR BRAKE
Filed Oct. 23, 1939   4 Sheets-Sheet 2

Inventor
Charles A. Campbell
By Dodge and Son
Attorneys

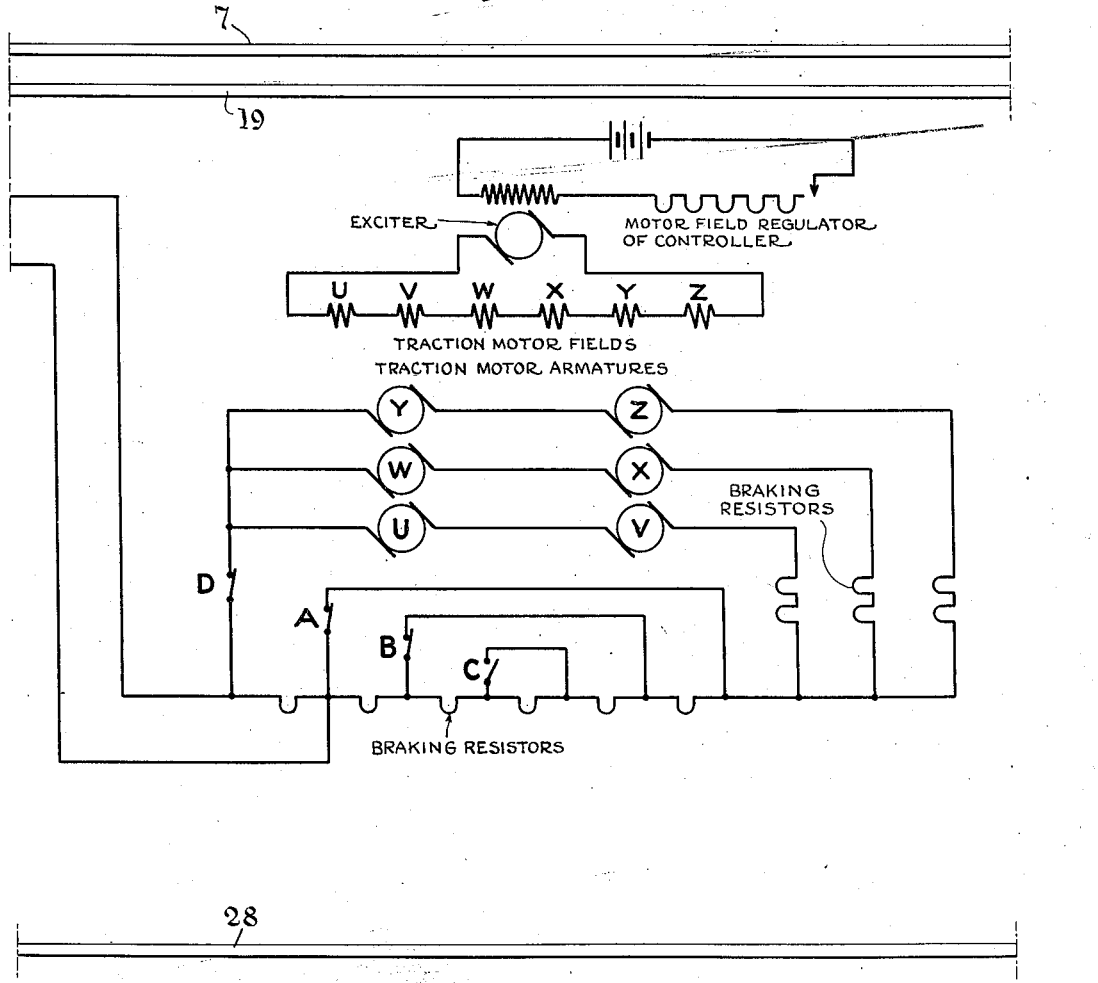

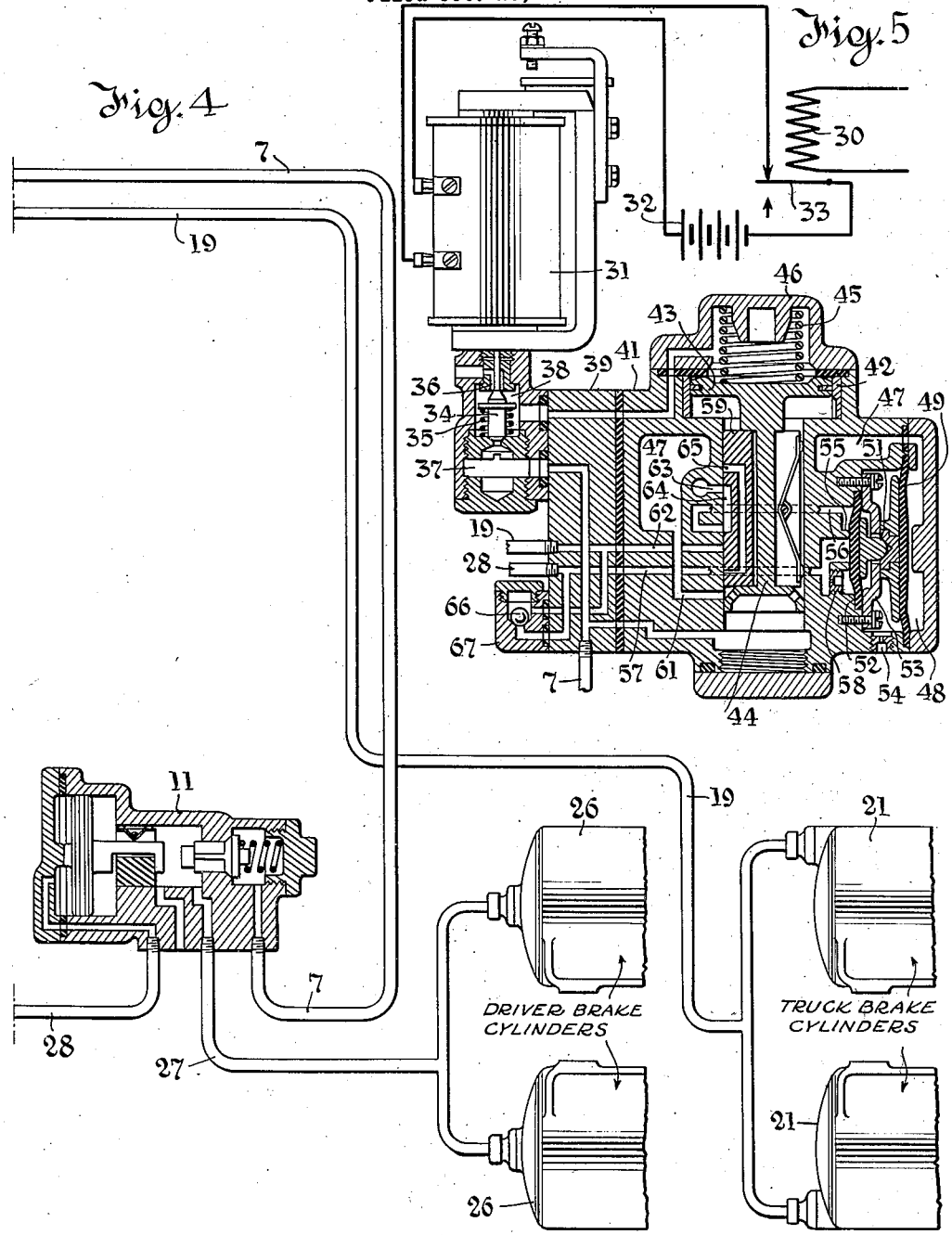

Patented Feb. 4, 1941

2,230,524

UNITED STATES PATENT OFFICE 2,230,524

AIR BRAKE

Charles A. Campbell, Watertown, N. Y., assignor to The New York Air Brake Company, a corporation of New Jersey Application October 23, 1939, Serial No. 300,826

5 Claims. (Cl. 303—3)

This invention relates to air brakes and particularly to the coordination of an air brake system, either of the conventional type or of the deceleration controlled type, and a so-called "resistance" or regenerative brake system.

On modern trains, there is a trend toward the use of locomotives in which the driving wheels are electrically driven and in which dynamic braking is used on the drivers. This may be of the resistance type or of the regenerative type so far as this invention is concerned.

The invention here described can be used with any electrically propelled locomotive, but for purposes of discussion, reference will be made to those locomotives in which a Diesel engine or a steam turbine drives a generator which furnishes the current for the propelling motors for the drivers. Dynamic braking involves the use of the propelling motors as generators, the torque reaction developed electrically being used to retard the locomotive. Such braking is desirable, particularly in grade work because it relieves the driver tires of heating such as is caused by the application of shoe brakes. It has the disadvantage that the braking effect fades out as the train slows down, so that the driver braking is lost as the train approaches a stop.

According to the present commercial practice, with dynamic brakes of the resistance type the retardation is most intense at about 20 M. P. H. which affords a retardation of about 1.2 M. P. H. per second. If speed is reduced below 20 M. P. H., the braking effect diminishes rapidly, and as a practical matter, is switched out about 10 M. P. H.

In order to provide braking on the drivers at low speeds, it is proposed to relate air brakes for the drivers to the control for the electric braking in such a way that as the electric brakes become inactive, pneumatic brakes are applied to the drivers with an intensity which corresponds to whatever air-brake application is then effective on the train. In other words, the driver brake cylinders are disconnected when the dynamic brakes are effective but are automatically connected to the pneumatic system at the time the electric system becomes inactive, under such control that their action will be harmonious with braking throughout the train.

The expression used above "with an intensity which corresponds to whatever air-brake application is then effective on the train" has particular significance in connection with deceleration controlled brakes because in a deceleration controlled brake, the brakes are released as the train approaches a stop, the rate of release being such as to maintain the deceleration rate approximately constant.

However, so far as the structure used in the present invention is concerned, it is immaterial whether the brakes be of the deceleration controlled type or some other type. Consequently, no attempt to illustrate a deceleration controlled system will be made in the accompanying drawings.

According to the invention, the pneumatic brakes apply on the drivers at a normal rate whenever an air brake application is made and no electric braking is in effect. However, if an electrical application on the drivers is made, either in advance of, or concurrently with an air brake application, the pneumatic brakes on the drivers are prevented from applying, although the pneumatic brakes throughout the rest of the train apply in a normal manner. Thereafter, when the electric brakes become ineffective or are cut out, the air brakes on the drivers apply to the same extent as the air brakes are then applied, but the rate of application, that is, the rate of development of pneumatic brake cylinder pressure is retarded, so the driver brakes apply rather slowly. Consequently, violent slack action does not occur.

The desirability of the type of brake contemplated by the present application depends somewhat on the braking characteristics of the locomotive with respect to the train. The invention is useful in a number of cases, one of which will be described as typical.

Suppose the electric braking effect is moderate as compared with the air braking so that the retardation rate produced on the locomotive by air brakes on the trucks and electric brakes on the drivers is lower than the deceleration produced by air braking on the cars. Under these conditions an application would occur with the slack stretched. Now suppose that when the pneumatic brakes become effective on the drivers, the deceleration rate for the locomotive increases, as normally it will. If it should become higher than the deceleration rate for the train as a whole, the effect will be to cause the slack to close. Under such conditions, it is highly desirable that the pneumatic driver brakes should come into action gradually so that the slack will close without undue shock.

The invention contemplates the use of an electric device, such as a magnet valve, whose state of energization is changed according to whether electric braking is or is not used. In the preferred embodiment, the device is de-energized in release and running conditions, and remains de-energized during braking unless electric braking on the drivers is used. If electric braking on the drivers is used, this device is energized and performs two sequential functions:

1. It prevents the delivery of air to the driver brake cylinders, and functions to vent the cylinders.

2. When the electric brakes are cut out or become ineffective, the electric device is de-energized and allows pressure to develop in the driver brake cylinders at a slow rate for a definite time interval, and then restores free communication from the braking system to the driver brake cylinders.

A by-pass check valve is used to permit the driver brakes to be released at any time, irrespective of the condition of the delay mechanism above-mentioned.

In the drawings:

Figures 1, 2, 3 and 4, assembled in the order stated, from left to right, produce a diagram of the braking mechanism on the locomotive. In this diagram, the pneumatic system is largely in section with the parts in running condition (all brakes released). Consequently, the control magnet valve is de-energized by the relay which opens when the dynamic brakes are inactive.

Figure 5 is a view of the control valve mechanism and relay switch shown in Figure 2, the parts being shown in the position which they assume during electric braking.

Figure 1:
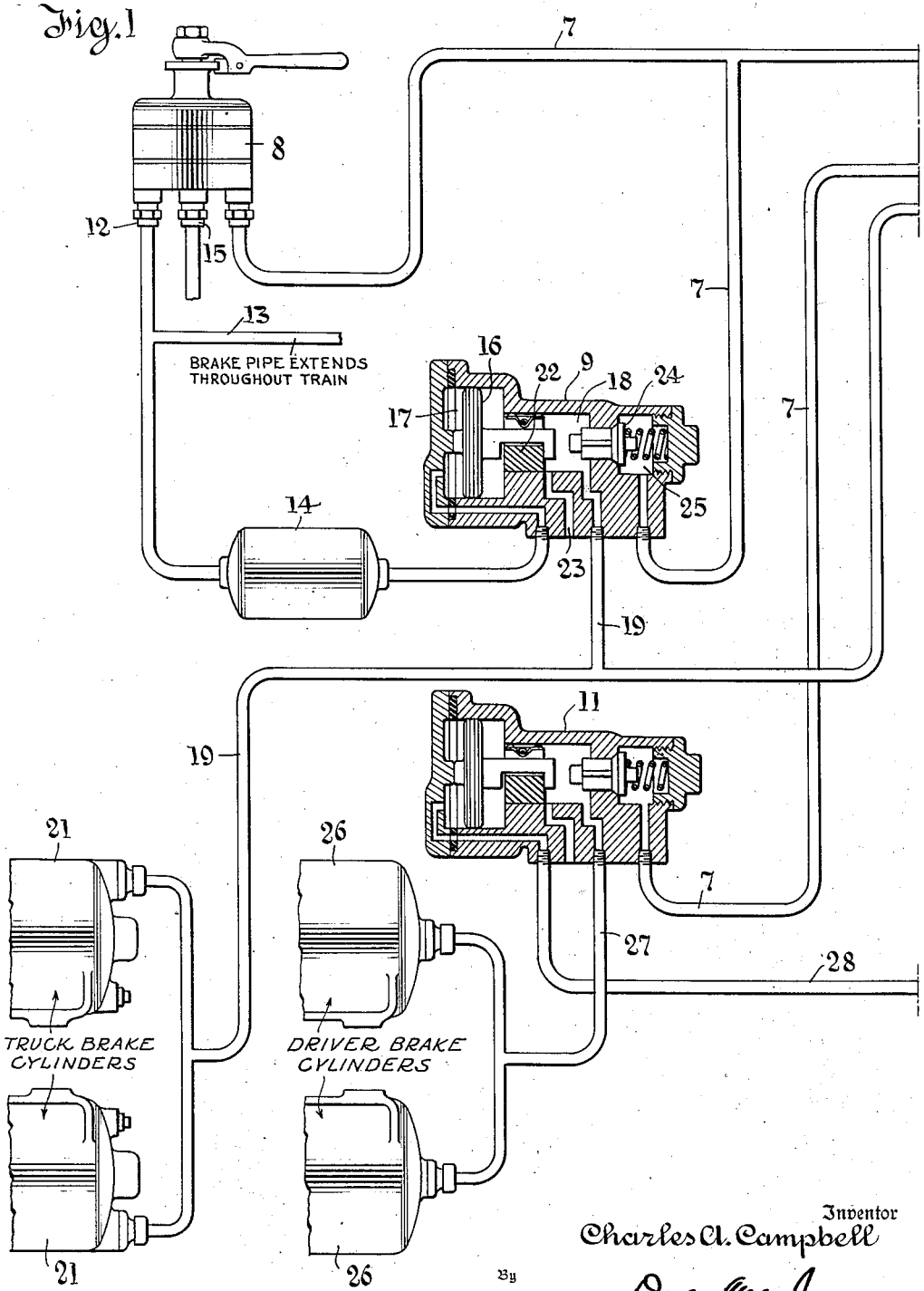

Referring first to Figures 1 to 4, a main reservoir 6, which typifies any source of air under pressure, supplies air through the main reservoir pipe 7 and its branches to an engineer's brake valve 8, to a relay 9 which controls the pressure in the truck brake cylinders, and to two relays 11 which control pressure in the driver brake cylinders. The relays are only diagrammatically illustrated, and since all three are identical, a general description of the relay 9 will suffice.

The engineer's brake valve 8 is of the ordinary straight-air type and in addition to a connection with the main reservoir pipe 7, has a connection 12 leading to a brake pipe 13 which extends throughout the train (the train connections are not shown), connection 12 also leading to a small volume reservoir 14. The brake valve 8 has an exhaust connection 15, and functions in release position to connect the brake pipe 12 with the exhaust connection 15; in application position, to connect the brake pipe 12 with the main reservoir pipe 7; and in lap position, to disconnect it from both.

The relay valve generally indicated at 9 has a piston 16 which separates a chamber 17, connected with the brake valve, from the chamber 18 which is connected by the pipe 19 and its branches with truck brake cylinders 21, four such cylinders being shown. Piston 16 actuates an exhaust valve 22 of the slide type which controls an exhaust port 23, and as it moves inwardly under rising pressure in the brake pipe 12, closes the exhaust port and then engages and unseats a poppet valve 24 which controls flow from the supply chamber 25 with which the main reservoir pipe 7 is connected. Thus, the relay 9 functions to establish pressures in the truck brake cylinders 21 which correspond with whatever pressure exists in the brake pipe 13. Therefore, for the truck brake cylinders, simply a relay straight-air system is used.

The relays 11 for the driver brake cylinders are identical. They are connected to the driver brake cylinders 26, of which four are shown (two for each relay 11) by pipes 27. They respond to whatever pressure is created in the pipe 28 which includes a small volume reservoir 29. Under normal running condition, i. e., brakes released, the pipe 28 is connected with a branch of the pipe 19 so that the relays 11 respond to the pressure established by the relay 9, and the relay 9 in turn responds to the pressure established in the brake pipe 12 by the engineer's brake valve 8. If the electric braking for the drivers is made effective, then the pipe 28 is disconnected from the pipe 19 and vented to atmosphere. When the electric driver braking becomes ineffective or fades out, the connection between the pipes 19 and 28 is restored by way of a restricted orifice and after a definite time interval is completely restored.

Before discussing the pneumatic mechanism, a brief description of the dynamic braking mechanism will be given. This is of the resistance type. The showing in Figure 3 is chosen because it happens to be the scheme used on the locomotive to which the present invention was first applied. The parts are identified on Figure 3 by legends. The "braking resistors" are water cooled resistance coils which dissipate in the form of heat, the energy generated by the motors when connected as generators, for the purpose of dynamic braking.

Three sections of the resistors are each connected in series with a pair of traction motors, to inhibit an unbalanced condition in the parallel circuits such as might be caused by differences in the motors or in wheel wear. The other resistor sections are connected in series with parallel shunts controlled by switches as a means for varying the resistance in the circuit.

The controller which regulates the retarding force produced by dynamic braking includes means for opening and closing the resistor switches A, B, C and D, and also for controlling the motor field regulator. In this way, a considerable number of controller positions are attainable. In practice, a current limit and kilowatt limit relay is used to regulate notching of the controller, but it is unnecessary to complicate the drawing and the description by a detailed disclosure of such features. It will be understood that in the diagram the motor fields indicated by the letters U to Z, inclusive, correspond to the motor armatures similarly lettered.

So far as coaction with the air brake system is concerned, it is sufficient to understand that when the contact D is closed and the dynamic braking is effective, relay winding 30 is energized sufficiently to pick up the contact 33 and close the circuit through the battery 32 and the winding 31. When the switch D is opened or dynamic braking is substantially ineffective, the winding 30 is de-energized or energized so weakly that the contactor 33 drops, thus breaking the circuit through the winding 31.

Figure 2:
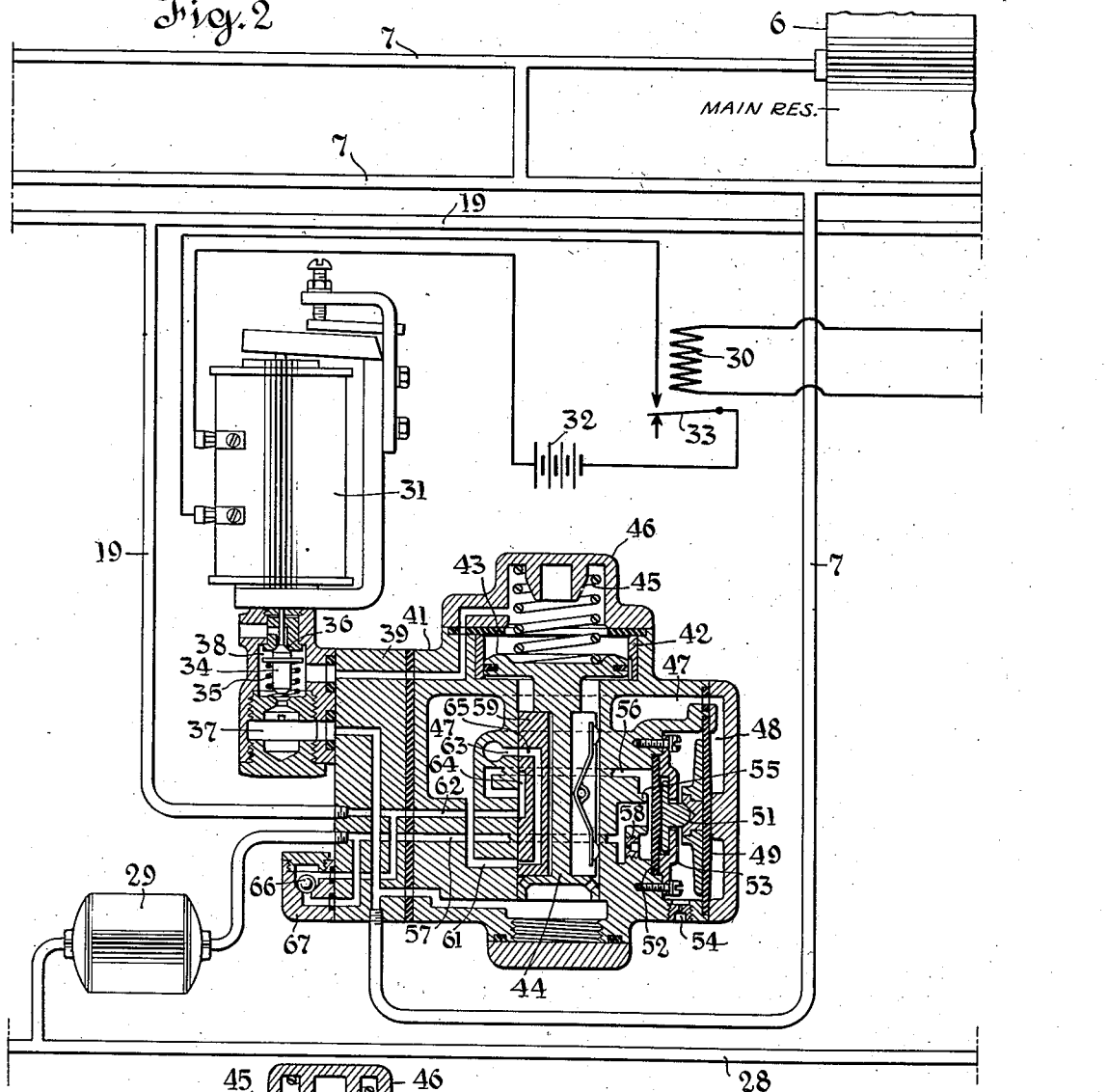

Figure 2 shows the circuit interrupted. Figure 5 shows the circuit closed. The particular form of dynamic brake and the particular means for controlling the circuit through the winding 31 are subject to the widest variation.

The important aspect is the nature of the control of energization of the winding 31 and the nature of the control effected by energization and de-energization of the winding 31.

Figure 6:
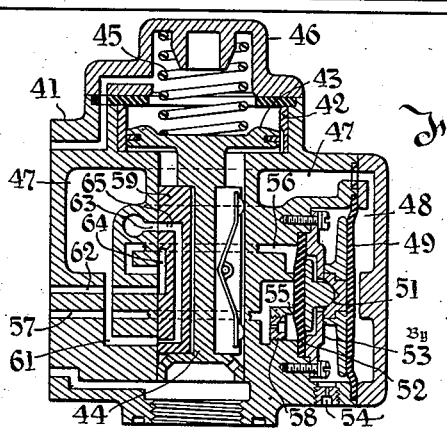
Figure 6 is a fragmentary view similar to a portion of Figure 5 showing the position assumed by the control valve when it has been restored by the fade-out or de-energization of the electric braking and during the timed interval in which build up of driver brake cylinder pressure is retarded.

Refer now to Figures 2, 5 and 6.

The winding 31, when energized, shifts downwardly a double-beat poppet valve 34 against the resistance of a coil compression spring 35. In its normal upward position, the valve 34 closes an exhaust port 36 and opens a supply port from a chamber 37 connected with a branch of the main reservoir pipe 7 to charge the valve chamber 38 in which the valve 34 is mounted. When the winding 31 is energized, the valve 34 is shifted to cut off supply from the chamber 37 and open the exhaust 36 so that the chamber 38 is vented to atmosphere.

The housing in which chamber 38 is formed is mounted on a pipe bracket 39. Mounted on the opposite side of the bracket 39 is housing 41 of the intercepting and timing valve. In the housing 41 is a cylinder bushing 42. In this is a piston 43 having a stem 44 which extends through a slide valve chamber, as shown. The piston is urged downwardly by a coil compression spring 45 which reacts between the piston and a removable cap 46. The space within the cap 46 above the piston 43 is in free communication with the chamber 38, already described. The valve chamber below the piston 43 is in free communication with a branch of the main reservoir pipe 7, so it is always at main reservoir pressure.

It follows, that if the winding 31 is de-energized, the pressures on the opposite sides of the piston 43 are equal and the spring 45 moves the piston to its lowermost position. If the winding 31 is energized, the valve 34 vents the space above the piston 43, and the piston moves to its uppermost position (see Fig. 5).

Surrounding the valve chamber and isolated therefrom is a volume reservoir or timing chamber 47 which is in free communication with a diaphragm chamber 48 on the outer side of a flexible diaphragm 49. The chamber 48 is enclosed by a removable cap which serves to retain the periphery of the diaphragm, as clearly shown in the drawings. The diaphragm operates through a ball and socket thrust connection, indicated at 51, upon a diaphragm valve 52 which is clamped at its periphery by a retainer ring 53. The space between the diaphragm is vented to atmosphere by way of a choke 54.

When the diaphragm valve 52 is forced inwardly, that is, to the left, it seats on a rim 55 and interrupts communication between a port 56 and a port 57 which, as clearly shown in the drawings, is in free communication with the pipe 28. However, a choke 58 provides restricted communication between the ports 56 and 57 when the valve 52 is closed.

Positively actuated by the piston 43 is a slide valve 59. In the seat of this slide valve are four ports, a port 61 which is connected to the timing chamber 47, a port 62, which is in free communication with the pipe 19, a branch of the port 56 and an atmospheric exhaust port 63. The slide valve has a cavity 64 and a loop port 65 which is restricted at its lower end, as clearly shown in the drawings.

The slide valve 59 has only two positions. In the normal position shown in Figures 2 and 6, the loop port 65 offers a restricted flow path from the timing chamber 47 to the atmospheric exhaust port 63, and the cavity 64 connects the ports 62 and 56. In the upper position of the piston 43 (shown in Figure 5), the port 65 is disconnected from all seat ports; port 61 is exposed by the slide valve; and the cavity 64 connects the port 56 to the atmospheric exhaust port 63.

A by-pass check valve 66 of the ball type is mounted in a housing 67 which is bolted to the bracket 39. This permits flow from the pipe 28 to the pipe 19, thus providing for exhaust of the driver brake cylinders at any and all times while inhibiting flow in the reverse direction past the check valve.

The operation of the device can now be described. Assume that a brake application is made without electric braking on the drivers. Under such conditions, the switch 33 will be open and winding 31 de-energized. The piston 43 will remain in its lower position as shown in Figure 2, so that the pipe 19 is connected by way of port 62 and cavity 64 with port 56, and since chamber 47 is then at atmospheric pressure, the valve 52 will be open and free communication will be established from port 56 to port 57. As a consequence, pressure will build up in pipe 28 in response to the development of pressure in pipe 19 and all brake cylinders 21 and 26 will apply.

Assume that a brake application is made with the resistance braking on the drivers effective. In such case, switch 33 closes; winding 31 is energized; and piston 43 is in its uppermost position as shown in Figure 5. Since the slide valve 59 then exposes the port 61, chamber 47 charges at once to main reservoir pressure. The effect is to close the valve 52, disconnecting pipe 19 from pipe 28. At this time, the choke 58 is effective to vent the pipe 28 to atmosphere because the port 56 is connected by way of cavity 64 with atmospheric exhaust port 63. Thus, the trucks will be braked pneumatically and the drivers will be braked electrically.

When resistance braking on the drivers fades out or is cut out, the resulting de-energization of winding 30 causes the switch 33 to open. This causes the piston 43 to descend. The parts assume the positions shown in Figure 6.

Chamber 47 which is at main reservoir pressure is connected to atmosphere through restricted loop port 65. Pipe 19 is connected by way of a cavity 64 with port 56 so that flow occurs from pipe 19 to pipe 28 at a rate restricted to the capacity of the choke 58. This restricted flow continues until the pressure in chamber 47 is substantially dissipated by the slow flow above described. When it is, reduction of pressure on the diaphragm 49 will permit the valve 52 to open, re-establishing free communication between the pipe 19 and pipe 28.

The purpose of the small volume reservoirs 14 and 29 is to increase the volume of the pipes to which they are connected and thus delay the development of braking pressures in the brake cylinders without requiring the use of unduly small ports. Where long pipes are used, these auxiliary volume reservoirs are reduced or eliminated altogether, as the case may be.

In order to illustrate the principle of the invention, a very simple embodiment has been shown, but it is obvious that the interruption and delay valve herein described may be interposed between the source of braking pressure and driver braking in almost any pneumatic system. Accordingly, the specific lay-out here chosen for purposes of explanation should be interpreted as illustrative.

As has been specifically suggested, the device is available for use with air brake systems, irrespective of whether the braking pressure is controlled in response to deceleration or in response to train speed or is subject to simple manual control. Obviously, the operative characteristics would vary to the extent that the control system affects them.

What is claimed is:

1. A braking system for a vehicle or train of vehicles having driving wheels and non-driving wheels, said system comprising dynamic braking means for driving wheels; means for controlling said dynamic braking means; pneumatic brakes for driving and for non-driving wheels, said pneumatic brakes having a normal rate at which they apply; means for controlling said pneumatic brakes as a unit; means responsive to application of the dynamic brakes and serving to inhibit applying of the pneumatic driving wheel brakes during application of the dynamic brakes and to suspend such inhibition upon termination of dynamic braking; means rendered effective upon termination of dynamic braking to lower the rate at which the pneumatic driving wheel brakes apply; and timing means for suspending the action of the last named means after a measured time interval.

2. A braking system for a vehicle or train of vehicles having driving wheels and non-driving wheels, said system comprising, electro-dynamic braking means for driving wheels; controlling means for said electro-dynamic braking means; pneumatic brakes for driving and for non-driving wheels; means for controlling said pneumatic brakes as a unit; a relay energized when said electro-dynamic brakes are substantially effective and de-energized when they are substantially ineffective; and a shiftable timing valve mechanism connected to be shifted upon energization of said relay to a position in which it inhibits application of said driving wheel pneumatic brakes, and thereafter upon de-energization of said relay shiftable to positions in which it first delays and thereafter freely permits application of said driving wheel pneumatic brakes.

3. A braking system for a vehicle or train of vehicles having driving wheels and non-driving wheels, said system comprising, electro-dynamic braking means for driving wheels; controlling means for said electro-dynamic braking means; pneumatic brakes for driving and for non-driving wheels; means for controlling said pneumatic brakes as a unit; a relay energized when said electro-dynamic brakes are substantially effective and de-energized when they are substantially ineffective; an electrically actuated pilot valve connected to be shifted reversely by energization and de-energization of said relay; and a combined timing and intercepting valve mechanism controlled by said pilot valve, the last-named valve mechanism having a normal position in which it connects the pneumatic driver brakes with the pneumatic system, an inhibiting position in which it interrupts said connection and vents the pneumatic driver brakes, and a timing position which it assumes in shifting from inhibiting to normal position and in which it closes such vent and offers restricted communication between such driving wheel brakes and the remainder of the pneumatic system.

4. The combination defined in claim 3, in which the combined timing and intercepting valve comprises a pressure motor controlled by said pilot valve to shift alternatively between normal and inhibiting positions, a distributing valve shiftable by said motor, a pressure-operated delay valve, a timing chamber in communication with the pressure-operated element of said delay valve and a restricted by-pass around said delay valve, the parts being so arranged that in normal position the distributing valve opens a restricted vent from said timing chamber and in inhibiting position closes said vent, charges said chamber and connects said restricted by-pass to atmosphere, to afford a restricted exhaust from the pneumatic driver brakes.

5. In the combination of an electro-dynamic braking circuit for driving wheels, a pneumatic braking unit including a control pipe and brake applying means for driving wheels; a relay switch controlled by the state of energization of said braking circuit; an electrically actuated valve shiftable to two alternative positions under the control of said relay switch; a pressure motor arranged to assume two different positions and controlled by said electrically actuated valve; a pressure operated intercepting valve interposed between the control pipe and said brake applying means; a timing chamber associated with the pressure operated element of said intercepting valve and arranged to close said valve when the chamber is under pressure; a restricted by-pass around said intercepting valve; and a distributing valve shiftable by said pressure motor between two positions, a normal position in which it opens a restricted vent from said timing chamber to atmosphere and establishes a connection from the control pipe to said intercepting valve, and an abnormal position in which it opens a charging connection to said timing chamber, closes said vent and the connection from control pipe to intercepting valve, and connects one end of said by-pass to atmosphere to assure venting of said brake-applying means.

CHARLES A. CAMPBELL.